April 26, 1938.    O. G. KEIL    2,115,110

SCREEN

Filed March 30, 1936    2 Sheets-Sheet 1

Inventor
Otto G. Keil

By Hardway Cathey
Attorneys

April 26, 1938.  O. G. KEIL  2,115,110
SCREEN
Filed March 30, 1936   2 Sheets-Sheet 2

Inventor
Otto G. Keil

By Hardway Tathey
Attorneys

Patented Apr. 26, 1938

2,115,110

UNITED STATES PATENT OFFICE 2,115,110

SCREEN

Otto G. Keil, Houston, Tex., assignor to Gulf Engineers Inc., Houston, Tex., a corporation of Texas Application March 30, 1936, Serial No. 71,673

2 Claims. (Cl. 209—326)

This invention relates to a screen.

An object of the invention is to provide screening apparatus which has been specially designed for the purpose of screening drilling fluid in order to remove the coarse particles and foreign matter therefrom.

It is another object of the invention to provide screening apparatus of the type described having a mud-collecting box and a declining screen above the box with novel means for vibrating the screen to facilitate the movement of the fluid, to be screened, thereover.

The invention also embodies a novel type of screen having sectional screening surfaces arranged in stepped relation whereby to more effectively agitate the material to be screened in order to accomplish a more effective separation of the coarser particles and foreign material from the drilling fluid to be recovered.

It is still another object of the invention to provide novel means for mounting the screen over the mud box.

In carrying on well drilling operations by the rotary drilling process the drilling fluid is forced down through the drill stem to the bottom of the bore and returned back up about said stem to the ground surface. This fluid is laden with solid material to give it the required weight to maintain the walls of the well bore during the drilling process. This material is usually finely ground and at the present time is a commercial product which can be obtained only at considerable expense and consequently it is desirable to maintain this drilling fluid or drilling mud in as pure a state as possible. Accordingly the screen herein described has been provided for the purpose of screening the drilling fluid returning from the well to remove therefrom the drill cuttings, coarse particles, and other foreign matter accumulated in the drilling fluid during the drilling operations. The screen herein described has proven very efficient for the purpose intended, and while it has been particularly designed for that purpose, yet it is capable of general use for similar purposes.

With the above and other objects in view, the invention has particular relation to certain novel features of construction, operation, and arrangement of parts, an example of which is given in this specification and illustrated in the accompanying drawings wherein.

Figure 1:
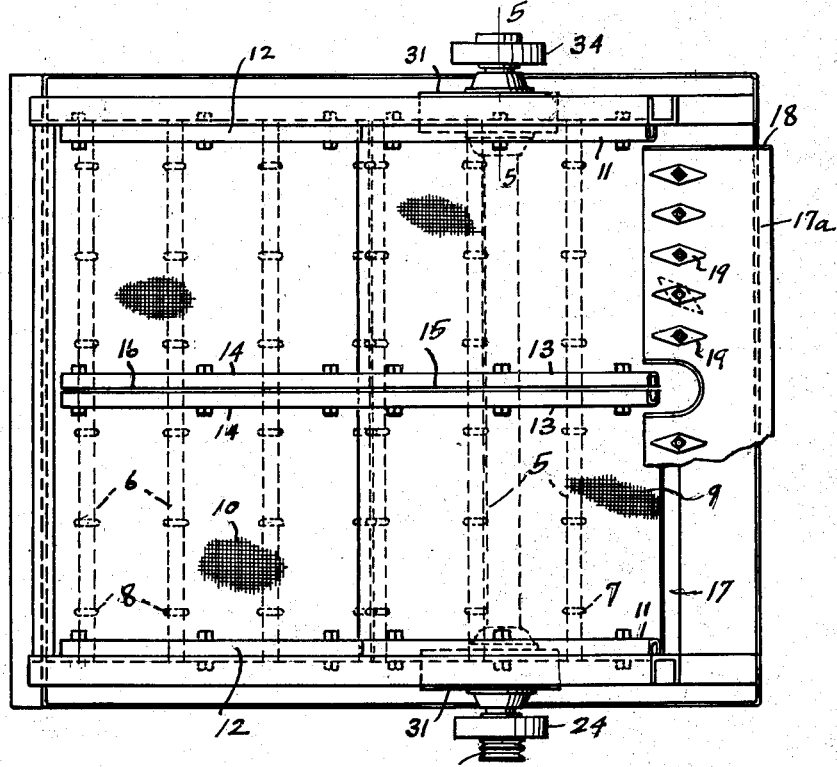
Figure 1 shows a plan view of the screen, partly broken away.
Figure 2:
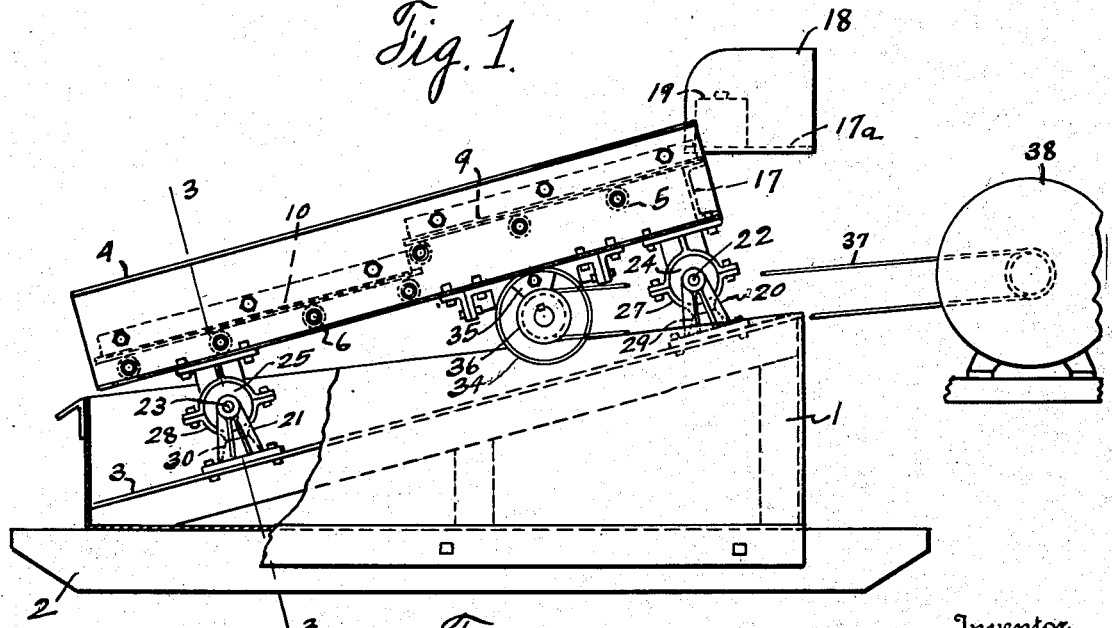
Figure 2 shows a side view, partly broken away and partly in section.

Referring now more particularly to the drawings wherein like numerals of reference designate the same parts in each of the figures, the numeral 1 designates a collecting box which is mounted on suitable runners 2, 2, and which has the inside, forwardly declining angle bars 3, 3, secured therein and forming supports for the screen to be hereinafter described. The box 1 may be formed of any suitable material, preferably sheet metal.

Above the collecting box 1 there is a forwardly declining screen having the side members 4, 4, preferably formed of channel irons which are connected by the upper and lower series of connecting tubes 5, 6, whose ends are welded or otherwise securely attached to the side members 4. The tubes 5, 6, have the surrounding, spaced, supporting rings 7, 8, formed of resilient material, such as rubber, to reenforce and support the screening elements 9, 10, above.

It will be noted that these elements are formed of sections secured in place, as hereinafter explained, and the forward, or lower element, 10 is off-set downwardly from the upper element 9 for a purpose to be hereinafter explained. The screening elements may be formed of wire mesh or other foraminated material.

Figure 3:
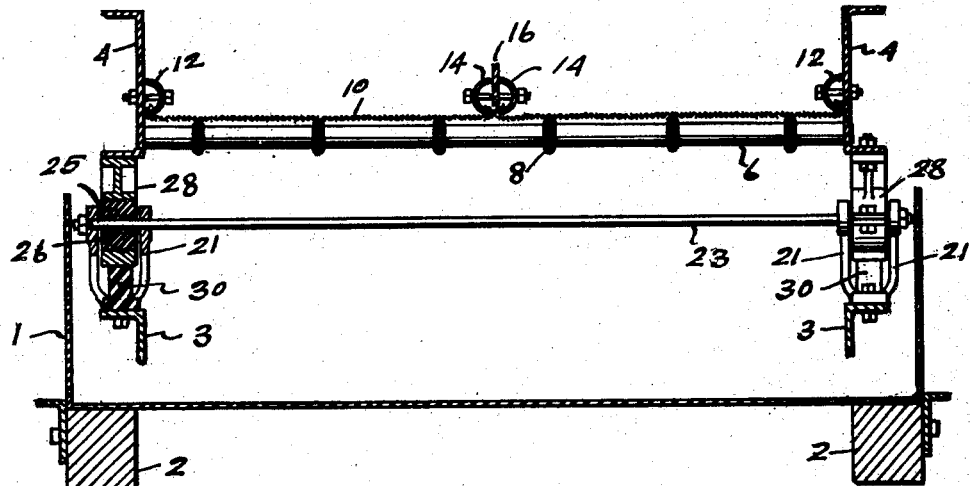
Figure 3 shows a cross-sectional view taken on the line 3—3 of Figure 2.
Figure 4:
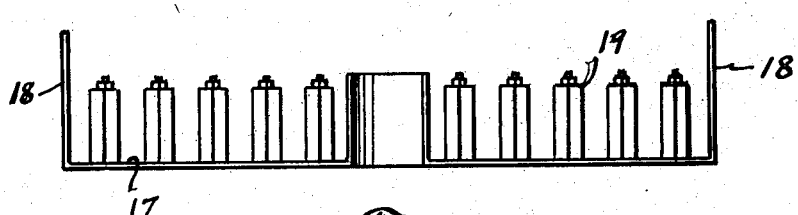
Figure 4 shows an inner end view of the distributing chute.
Figure 5:
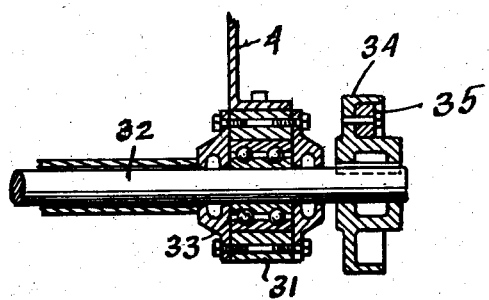
Figure 5 shows a fragmentary cross-sectional view taken on the line 5—5 of Figure 1.

The outer margins of the screening elements are clamped to the side members 4 by means of the half-round upper and lower clamps 11, 11, 12, 12, and the inner margins of the sections of the screening elements are clamped together by similar half-round complemental clamps 13, 13, and 14, 14. The clamps 11, 11, and 12, 12, are bolted to the side members 4, 4, by suitable bolts which pass through said clamps and said members and the adjacent margins of the screening elements are clamped between said side members and the lower margins of the clamps as is clearly shown in Figure 3. The adjacent margins of the sections of the screening elements are secured between the lower margins of the clamps 13, 13, and 14, 14, which are bolted together and the upper and lower partitions 15, 16, are clamped between the upper margins of the respective clamps 13, 14, in a manner as is clearly illustrated in Figure 3. The screening elements 9, 10 are disposed so as to rest on and be supported by the supporting rings 7, 8.

The upper margin of the screening element 9 is supported by a transverse channel 17 whose ends are securely anchored to the respective side members 4. It will be accordingly noted that the screening elements are composed of right and left sections whose margins are securely anchored, and this construction will minimize the tendency of the screen to sag and make it possible to replace a single section should it become worn out without replacing the entire screening element.

At the upper end of the screen and suitably supported in place there is a mud distributing chute having the bottom 17a and the upstanding ends 18, 18. This chute has the upstanding distributors 19 spaced apart therealong from end to end. They are preferably diamond shaped in horizontal cross-sectional contour and are adjustable about vertical axes as indicated in dotted lines in Figure 1 so as to efficiently distribute the drilling fluid delivered through the chute on to the screen. The drilling fluid returning from the well may be delivered into the chute by any suitable means provided for that purpose and the fluid will pass by gravity downwardly over the screening surfaces. Such passage will be assisted by the vibration of the screen as hereinafter explained. Drilling fluid to be recovered and reconditioned will pass through the screens into the collecting box beneath for further use but the drill cuttings and other large particles and objectionable matter will be screened out from the drilling fluid and will pass on over the screen and be discharged outside of the box 1 from the lower end of the screen.

As the fluid passes down over the screens, the drill cuttings and larger particles to be screened out have a tendency to collect on the screening surface and clog the same, with the result that a part of the fluid to be reconditioned and recovered is excluded from passing through the screening surfaces, and for that reason, the lower screen 10 has been off-set downwardly from the upper screen 9 so that the material passing off of the upper screen will be agitated and the layer of cuttings and heavy particles that may have formed on the upper screen will be broken up, thus facilitating the passage of the finer drilling fluid to be recovered through the screen into the collecting box 1.

Upstanding from the angle bars 3, 3, on each side are the pairs of upper and lower brackets 20, 20, and 21, 21, whose upper ends have aligned bearings through which the transverse upper and lower rods 22 and 23 pass, and by means of which said rods are supported. On these respective rods and between said respective brackets are the circular resilient supporting elements or vibrating blocks 24, 24, 25, 25, which are lined with metal ferrules, as 26, shown in Figure 3. The supporting elements 24, 25 are closely surrounded by the clamps 27, 27 and 28, 28 which are bolted to, and support the side members 4, 4, of the screen above.

Bumpers 29, 29, 30, 30, are secured to, and upstand from, the angle bars 3, 3, and are aligned underneath, and support the clamps 27, 28. These bumpers or supports are preferably formed of rubber or other similar resilient material.

Anchored to and depending from the side members 4, 4 of the screen are the bearings 31, 31, through which the transverse shaft 32 extends. Anti-friction bearing assemblies 33, are enclosed within the bearings 31 on which the shaft 32 runs. Fixed on the respective ends of the shaft 32 are the momentum wheels 34, 34, which are provided with eccentric counterweights 35, 35.

One end of the shaft 32 is equipped with a driving sheave 36 to receive the driving belts, as 37, which are driven from a suitable motor 38 of any conventional construction.

As the shaft 32 and the momentum wheels 34 are rotated, the counterweights 35 will cause a slight oscillation, vertically, of the screen, and this oscillation will be permitted by the resilient vibrating blocks 24, 25. This construction will permit sufficient vibration of the screen, but will prevent the vibration from becoming too violent. The vibrator supports or bumpers 29, 30, will limit the range of oscillation when the vibrating blocks 24, 25, lose their resiliency.

When the drilling fluid has been screened and collected in the collecting box, it may be drained off into a pit by any suitable appliance provided for the purpose, for re-use.

The drawings and description disclose what is now considered to be a preferred form of the invention by way of illustration only, while the broad principle of the invention will be defined by the appended claims.

What I claim is:

1. A screen comprising a frame having a foraminated bottom, side supports for the screen, brackets upstanding from said supports having aligned bearings, transverse rods working through said bearings, resilient supporting elements on the rods, clamps surrounding said supporting elements and attached to and supporting said frames and resilient bumpers on said side supports aligned underneath said clamps, the tops of said bumpers being substantially in contact with the bottoms of said clamps.

2. A screen comprising a frame having a foraminated bottom, side supports for the screen, brackets carried by said supports and having aligned bearings, transverse rods through said bearings, resilient vibrating blocks on the rods, clamps around said blocks and attached to and supporting the frame and resilient bumpers supported in alignment with and underneath said clamps and substantially in contact with the bottoms of the clamps.

OTTO G. KEIL.